(12) United States Patent
Takeda et al.

(10) Patent No.: US 7,207,912 B2
(45) Date of Patent: Apr. 24, 2007

(54) BICYCLE SHIFT CONTROL APPARATUS THAT PREVENTS UNDESIRABLE CHAIN ANGLES

(75) Inventors: Kazuhiro Takeda, Sakai (JP); Tadashi Ichida, Ikoma (JP)

(73) Assignee: Shimano, Inc., Sakai, Osaka (JP)

( * ) Notice: Subject to any disclaimer, the term of this patent is extended or adjusted under 35 U.S.C. 154(b) by 652 days.

(21) Appl. No.: 10/708,169

(22) Filed: Feb. 12, 2004

(65) Prior Publication Data

US 2004/0166972 A1    Aug. 26, 2004

(30) Foreign Application Priority Data

Feb. 25, 2003    (JP) .............................. 2003-047407

(51) Int. Cl.
*F16H 63/08*    (2006.01)
*B62M 11/00*    (2006.01)
*B62M 1/02*    (2006.01)

(52) U.S. Cl. ..................... 474/78; 474/80; 474/81; 474/87; 280/260

(58) Field of Classification Search .......... 474/69–71, 474/78–82, 87; 280/236–238, 259–261; 318/560–646; 74/335, 336 R; 701/51–57, 701/62, 66

See application file for complete search history.

(56) References Cited

U.S. PATENT DOCUMENTS

| 5,213,548 | A | * | 5/1993 | Colbert et al. ................. 474/71 |
| 5,261,858 | A |   | 11/1993 | Browning |
| 5,356,348 | A | * | 10/1994 | Bellio et al. ................... 474/70 |
| 5,483,137 | A | * | 1/1996 | Fey et al. ...................... 318/560 |
| 5,577,969 | A |   | 11/1996 | Watarai |
| 5,865,454 | A |   | 2/1999 | Campagnolo |
| 6,007,441 | A | * | 12/1999 | Tysver ........................... 474/70 |
| 6,367,833 | B1 |   | 4/2002 | Horiuchi ....................... 280/260 |
| 6,454,288 | B1 |   | 9/2002 | Horiuchi ....................... 280/260 |
| 6,467,786 | B2 |   | 10/2002 | Horiuchi ....................... 280/260 |
| 6,634,971 | B2 | * | 10/2003 | Campagnolo ................. 474/78 |
| 6,722,220 | B2 | * | 4/2004 | Takeda .......................... 474/78 |
| 6,931,958 | B2 | * | 8/2005 | Takeda .......................... 474/70 |

* cited by examiner

*Primary Examiner*—Marcus Charles
(74) *Attorney, Agent, or Firm*—James A. Deland

(57) ABSTRACT

A shift control apparatus is provided for a bicycle having a plurality of front sprockets and a plurality of rear sprockets, wherein a front derailleur shifts a chain among the plurality of front sprockets and a rear derailleur shifts the chain among the plurality of rear sprockets. The apparatus comprises a shift unit that provides signals for shifting the front derailleur and the rear derailleur; and a prohibiting unit operatively coupled to the shift unit and providing signals so that the chain is prohibited from engaging at least one of i) a laterally innermost front sprocket in combination with a laterally outermost rear sprocket, and ii) a laterally outermost front sprocket in combination with a laterally innermost rear sprocket.

24 Claims, 13 Drawing Sheets

|  |  | R1 | R2 | R3 | R4 | R5 | R6 | R7 |
|---|---|---|---|---|---|---|---|---|
| TABLE 4 | F1 | 4.53 | 5.25 | 6.25 | 7.73 | 8.76 | 10.10 | 11.94 |
|  | F2 | 6.42 | 7.44 | 8.86 | 10.94 | 12.40 | 14.31 | 16.91 |
|  | F3 | 8.68 | 10.07 | 11.99 | 14.81 | 16.78 | 19.36 | 22.88 |
| TABLE 3 | F1 | 4.89 | 5.67 | 6.75 | 8.34 | 9.45 | 10.90 | 12.88 |
|  | F2 | 6.92 | 8.03 | 9.56 | 11.81 | 13.38 | 15.44 | 18.25 |
|  | F3 | 9.36 | 10.86 | 12.93 | 15.98 | 18.11 | 20.89 | 24.69 |
| TABLE 2 | F1 | 5.24 | 6.08 | 7.24 | 8.94 | 10.14 | 11.70 | 13.82 |
|  | F2 | 7.43 | 8.62 | 10.26 | 12.67 | 14.36 | 16.57 | 19.58 |
|  | F3 | 10.05 | 11.66 | 13.88 | 17.14 | 19.43 | 22.42 | 26.50 |
| TABLE 1 | F1 | 5.60 | 6.50 | 7.73 | 9.55 | 10.83 | 12.49 | 14.77 |
|  | F2 | 7.93 | 9.20 | 10.96 | 13.54 | 15.34 | 17.70 | 20.92 |
|  | F3 | 10.74 | 12.45 | 14.83 | 18.31 | 20.76 | 23.96 | 28.30 |
| TABLE 0 | F1 | 5.96 | 6.91 | 8.23 | 10.16 | 11.52 | 13.29 | 15.71 |
|  | F2 | 8.44 | 9.79 | 11.66 | 14.40 | 16.32 | 18.83 | 22.25 |
|  | F3 | 11.42 | 13.25 | 15.77 | 19.48 | 22.08 | 25.48 | 30.11 |
| TABLE −1 | F1 | 6.32 | 7.33 | 8.72 | 10.77 | 12.21 | 14.09 | 16.65 |
|  | F2 | 8.95 | 10.38 | 12.36 | 15.26 | 17.30 | 19.96 | 23.59 |
|  | F3 | 12.11 | 14.04 | 16.72 | 20.65 | 23.40 | 27.01 | 31.92 |
| TABLE −2 | F1 | 6.67 | 7.74 | 9.22 | 11.38 | 12.90 | 14.89 | 17.59 |
|  | F2 | 9.45 | 10.97 | 13.06 | 16.13 | 18.28 | 21.09 | 24.93 |
|  | F3 | 12.79 | 14.84 | 17.66 | 21.82 | 24.73 | 28.53 | 33.72 |
| TABLE −3 | F1 | 7.03 | 8.16 | 9.71 | 11.99 | 13.59 | 15.68 | 18.54 |
|  | F2 | 9.96 | 11.55 | 13.76 | 16.99 | 19.26 | 22.22 | 26.26 |
|  | F3 | 13.48 | 15.63 | 18.61 | 22.99 | 26.05 | 30.06 | 35.53 |
| TABLE −4 | F1 | 7.39 | 8.57 | 10.20 | 12.60 | 14.28 | 16.48 | 19.48 |
|  | F2 | 10.47 | 12.14 | 14.45 | 17.86 | 20.24 | 23.35 | 27.60 |
|  | F3 | 14.16 | 16.43 | 19.56 | 24.16 | 27.38 | 31.59 | 37.34 |

Fig. 12

|  |  | R2 | R3 | R4 | R5 | R6 | R7 | R8 |
|---|---|---|---|---|---|---|---|---|
| TABLE 4 | F1 | 3.98 | 4.53 | 5.25 | 6.25 | 7.73 | 8.76 | 10.10 |
|  | F2 | 5.64 | 6.42 | 7.44 | 8.86 | 10.94 | 12.40 | 14.31 |
|  | F3 | 7.63 | 8.68 | 10.07 | 11.99 | 14.81 | 16.78 | 19.36 |
| TABLE 3 | F1 | 4.29 | 4.89 | 5.67 | 6.75 | 8.34 | 9.45 | 10.90 |
|  | F2 | 6.08 | 6.92 | 8.03 | 9.56 | 11.81 | 13.38 | 15.44 |
|  | F3 | 8.23 | 9.36 | 10.86 | 12.93 | 15.98 | 18.11 | 20.89 |
| TABLE 2 | F1 | 4.61 | 5.24 | 6.08 | 7.24 | 8.94 | 10.14 | 11.70 |
|  | F2 | 6.53 | 7.43 | 8.62 | 10.26 | 12.67 | 14.36 | 16.57 |
|  | F3 | 8.83 | 10.05 | 11.66 | 13.88 | 17.14 | 19.43 | 22.42 |
| TABLE 1 | F1 | 4.92 | 5.60 | 6.50 | 7.73 | 9.55 | 10.83 | 12.49 |
|  | F2 | 6.97 | 7.93 | 9.20 | 10.96 | 13.54 | 15.34 | 17.70 |
|  | F3 | 9.43 | 10.74 | 12.45 | 14.83 | 18.31 | 20.76 | 23.95 |
| TABLE 0 | F1 | 5.24 | 5.96 | 6.91 | 8.23 | 10.16 | 11.52 | 13.29 |
|  | F2 | 7.42 | 8.44 | 9.79 | 11.66 | 14.40 | 16.32 | 18.83 |
|  | F3 | 10.04 | 11.42 | 13.25 | 15.77 | 19.48 | 22.08 | 25.48 |
| TABLE −1 | F1 | 5.55 | 6.32 | 7.33 | 8.72 | 10.77 | 12.21 | 14.09 |
|  | F2 | 7.86 | 8.95 | 10.38 | 12.36 | 15.26 | 17.30 | 19.96 |
|  | F3 | 10.64 | 12.11 | 14.04 | 16.72 | 20.65 | 23.40 | 27.01 |
| TABLE −2 | F1 | 5.86 | 6.67 | 7.74 | 9.22 | 11.38 | 12.90 | 14.89 |
|  | F2 | 8.31 | 9.45 | 10.97 | 13.06 | 16.13 | 18.28 | 21.09 |
|  | F3 | 11.24 | 12.79 | 14.84 | 17.66 | 21.82 | 24.73 | 28.53 |
| TABLE −3 | F1 | 6.18 | 7.03 | 8.16 | 9.71 | 11.99 | 13.59 | 15.68 |
|  | F2 | 8.75 | 9.96 | 11.55 | 13.76 | 16.99 | 19.26 | 22.22 |
|  | F3 | 11.84 | 13.48 | 15.63 | 18.61 | 22.99 | 26.05 | 30.06 |
| TABLE −4 | F1 | 6.49 | 7.39 | 8.57 | 10.20 | 12.60 | 14.28 | 16.48 |
|  | F2 | 9.20 | 10.47 | 12.14 | 14.45 | 17.86 | 20.24 | 23.35 |
|  | F3 | 12.45 | 14.16 | 16.43 | 19.56 | 24.16 | 27.38 | 31.59 |

Fig. 13

BICYCLE SHIFT CONTROL APPARATUS THAT PREVENTS UNDESIRABLE CHAIN ANGLES

BACKGROUND OF INVENTION

The present invention is directed to bicycles and, more particularly, to a shift control apparatus that prevents undesirable chain angles.

Some bicycles are equipped with shift control devices that automatically control the operation of front and rear transmissions (e.g., front and rear derailleurs that respectively cooperate with a plurality of front and rear sprockets) depending on bicycle velocity. An example of such a system is disclosed in JP 8-501,742. In that system, the bicycle chain may be engaged automatically with any combination of front and rear sprockets depending upon the velocity of the bicycle. The use of all sprocket combinations better accommodates more sensitive changes in riding conditions than is possible by operating the rear transmission alone and also avoids unnecessary shifting.

In the case of external transmissions that employ front and rear derailleurs and a corresponding plurality of sprockets for each derailleur, the front sprocket having the greatest number of teeth typically is the laterally outermost sprocket (along the crankshaft axis), with the number of teeth on the other sprockets progressively declining as one moves axially inward. On the other hand, the rear sprocket having the greatest number of teeth typically is the laterally innermost sprocket (along the hub axis), with the number of teeth on the other sprockets progressively declining as one moves axially outward. As a result, a chain engaging the laterally outermost front and rear sprockets provides the highest gear ratio, and a chain engaging the laterally innermost front and rear sprockets provides the lowest gear ratio.

Since conventional automatic bicycle transmissions use all sprocket combinations to accommodate many riding conditions and to avoid unnecessary shifting, the chain sometimes will engage the front and rear sprockets having the greatest number of teeth as well as the front and rear sprockets having the fewest number of teeth. The same is also true with manual shifting. These front/rear sprocket combinations represent combinations in which the chain engages an axially outermost sprocket and an axially innermost sprocket, and each causes a substantial longitudinal inclination of the chain with large angles of approach and departure relative to the sprockets. Such configurations result in poor transmission efficiency from the front sprocket to the chain and from the chain to the rear sprocket. Substantial noise and wear on the chain and sprockets also result, especially if the chain is not properly lubricated.

SUMMARY OF INVENTION

The present invention is directed to various features of a bicycle transmission. In one embodiment, a shift control apparatus is provided for a bicycle having a plurality of front sprockets and a plurality of rear sprockets, wherein a front derailleur shifts a chain among the plurality of front sprockets and a rear derailleur shifts the chain among the plurality of rear sprockets. The apparatus comprises a shift unit that provides signals for shifting the front derailleur and the rear derailleur; and a prohibiting unit operatively coupled to the shift unit and providing signals so that the chain is prohibited from engaging at least one of i) a laterally innermost front sprocket in combination with a laterally outermost rear sprocket, and ii) a laterally outermost front sprocket in combination with a laterally innermost rear sprocket. Additional inventive features will become apparent from the description below, and such features alone or in combination with the above features may form the basis of further inventions as recited in the claims and their equivalents.

BRIEF DESCRIPTION OF DRAWINGS

FIG. 12 is a plurality of tables of particular embodiments of upshift threshold values; and FIG. 13 is a plurality of tables of particular embodiments of downshift threshold values.

DETAILED DESCRIPTION

Figure 1:
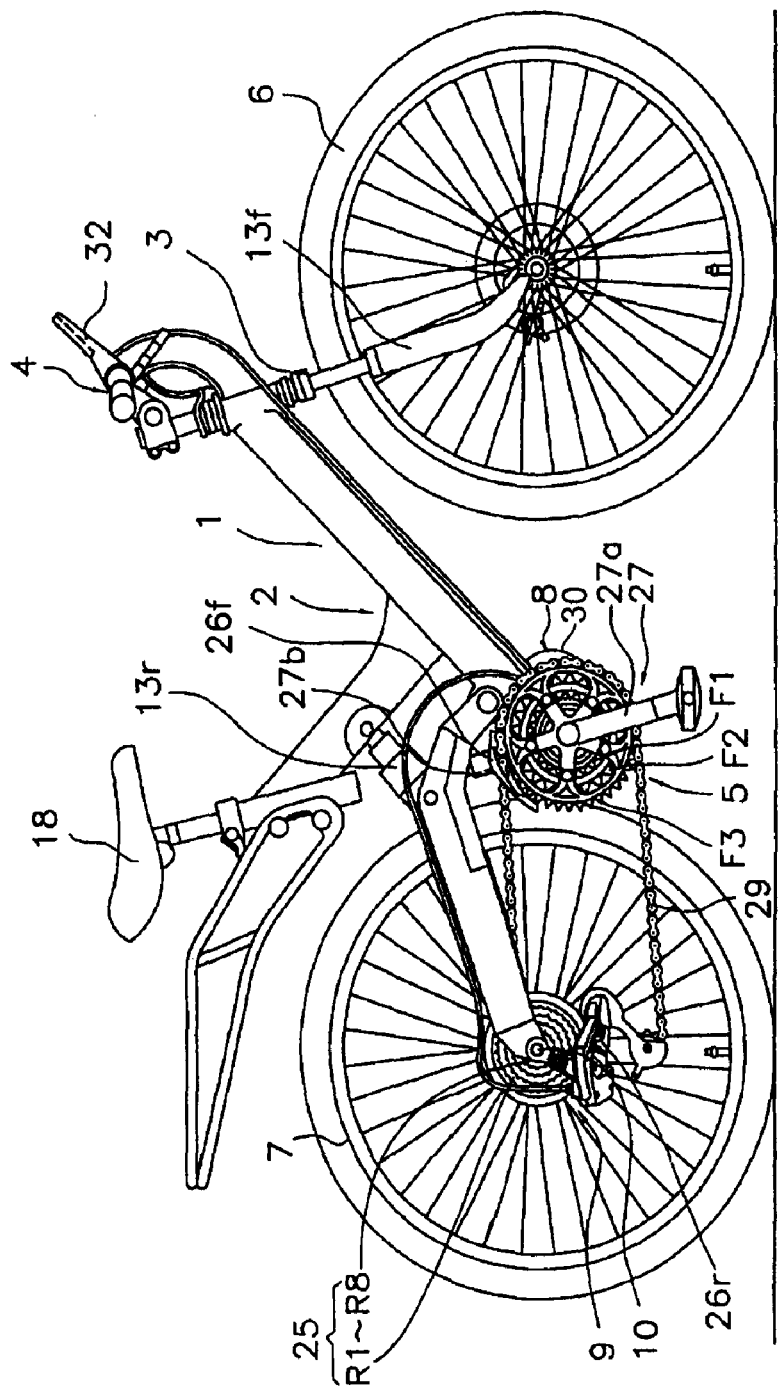
FIG. 1 is a side view of a particular embodiment of a bicycle.

FIG. 1 is a side view of a particular embodiment of a bicycle 1. Bicycle 1 comprises a frame body 2 constructed by welding together tubing having noncircular cross-sections. A front fork 3 is mounted to the front of frame body 2 for rotation around an inclined axis, and a handlebar assembly 4 is mounted to the top of front fork 3. A saddle 18 is mounted to the upper middle part of frame body 2, a drive mechanism 5 is mounted to the lower part of frame body 2, a front wheel 6 is rotatably mounted to the bottom of front fork 3, and a rear wheel 7 having a hub dynamo 10 is rotatably mounted to the rear of frame body 2. Hub dynamo 10 houses an alternating current generator 19 (FIG. 3) for generating electricity through rotation of rear wheel 7. A front transmission 8 including a front derailleur 26f is mounted to the lower middle part of frame body 2, and a rear transmission 9 including a rear derailleur 26r is mounted to the rear of frame body 2. A front suspension 13f is mounted to front fork 3, and a rear suspension 13r is mounted between stationary and articulated portions of frame body 2.

Figure 2:
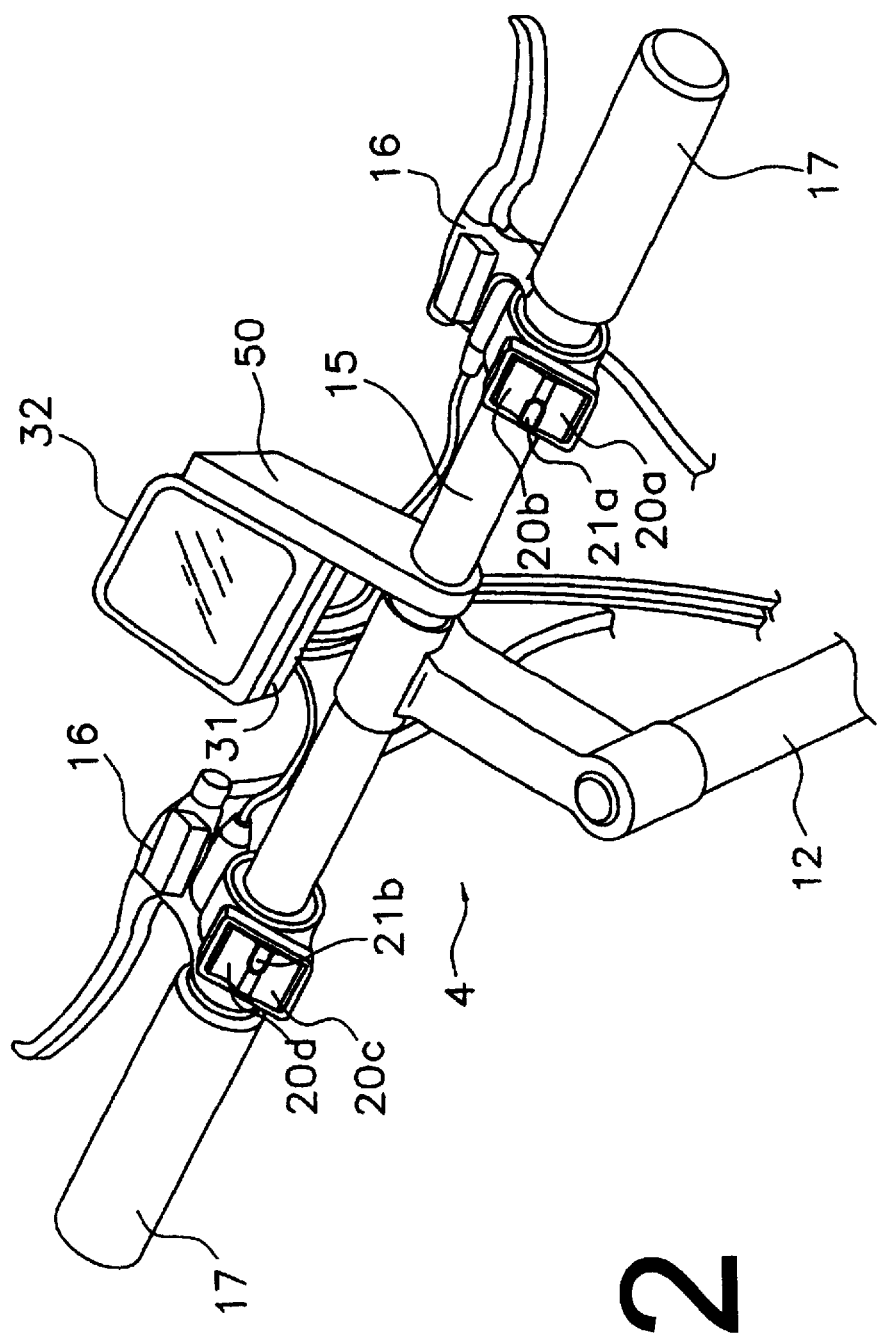
FIG. 2 is a more detailed view the handlebar assembly.

As shown in FIG. 2, handlebar assembly 4 comprises a handle stem 12 mounted to the top of front fork 3 and a handlebar 15 mounted to the top of handle stem 12. Brake lever assemblies 16 and grips 17 are mounted at the opposite ends of handlebar 15. The right side brake lever assembly 16 includes a rear downshift switch 20a for manually downshifting rear derailleur 26r in single increments, a rear upshift switch 20b for manually upshifting rear derailleur 26r in single increments, and a mode switch 21a for switching between automatic and manual shift modes. The left side brake lever assembly 16 includes a front downshift switch 20c for manually downshifting front derailleur 26f in single increments, a front upshift switch 20d for manually upshifting front derailleur 26f in single increments, and a suspension control switch 21b for adjusting the stiffness of front suspension 13f and rear suspension 13r.

As shown in FIG. 1, drive mechanism 5 comprises a crank 27 rotatably mounted at the bottom bracket of frame body 2, front and rear transmissions 8 and 9, and a chain 29. Front transmission 8 comprises, for example, three front sprockets F1–F3 and front derailleur 26f. Front sprockets F1–F3 are mounted to crank 27, and front derailleur 26f is mounted on frame body 2. Rear transmission 9 comprises, for example, a multiple sprocket assembly 25 having eight rear sprockets R1–R8 and rear derailleur 26r. Multiple sprocket assembly 25 is mounted to rear wheel 7 and rear derailleur 26r is mounted at the back of frame body 2. Crank 27 comprises a right crank arm 27a and a left crank arm 27b, wherein front sprockets F1–F3 are mounted to right crank arm 27a. Chain 29 engages one of the front sprockets F1–F3 and one of the rear sprockets R1–R8.

Front sprockets F1–F3 are arranged in the order of an increasing number of teeth, wherein front sprocket F1 is the laterally innermost front sprocket having the least number of teeth, and front sprocket F3 is the laterally outermost front sprocket having the most number of teeth. Rear sprockets R1–R8 are arranged in the order of a decreasing number of teeth, wherein rear sprocket R1 is the laterally innermost rear sprocket having the most number of teeth, and rear sprocket R8 is the laterally outermost rear sprocket having the least number of teeth.

A rotation sensor (not shown in FIG. 1) is provided for sensing the rotation of crank 27. The presence or absence of rotation of crank 27 ordinarily is used in part to control the operation of front and rear transmissions 8 and 9. For example, derailleurs cannot shift properly when crank 27 is stationary, so any requested operation of a derailleur may be delayed until crank 27 is rotating. A rotation sensor typically comprises a reed switch 23 (FIG. 3) mounted to frame body 2 and a magnet (not shown) mounted to one of the crank arms 27a and 27b so that reed switch 23 provides a pulse whenever the magnet passes by.

A controller 11 (FIG. 3) is provided for controlling various components including the front and rear transmissions 8 and 9 and the front and rear suspensions 13f and 13r. More specifically, controller 11 controls front and rear transmissions 8 and 9 in response to the operation of shift switches 20a–20d and mode switch 21a, and it controls front and rear suspensions 13f and 13r in response to the operation of control switch 21b. Controller 11 also automatically controls the operation of front and rear transmissions 8 and 9 in response to bicycle velocity.

Figure 3:
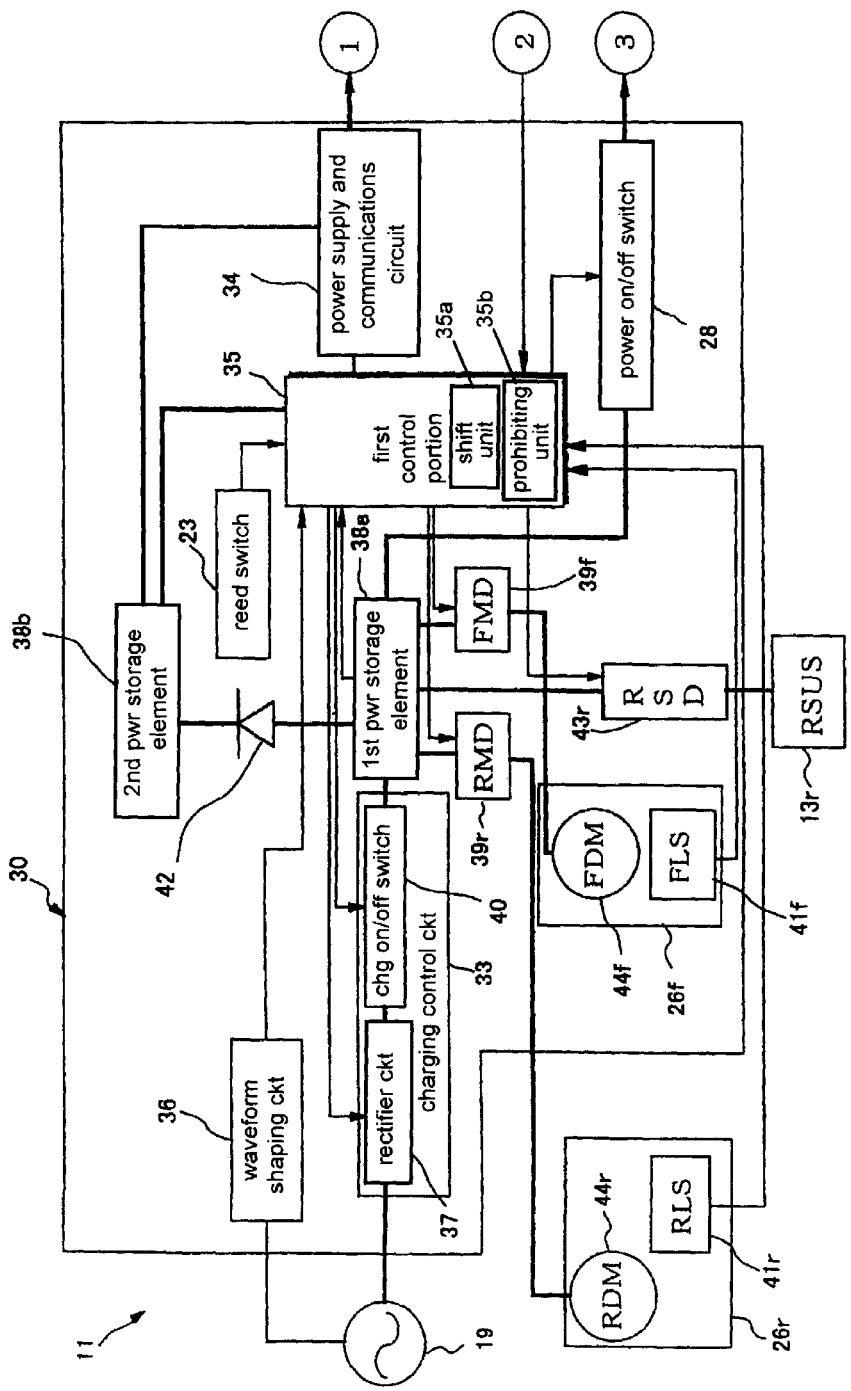
FIGS. 3 and 4 are schematic block diagrams of a computer control device for components of the bicycle.
Figure 4:
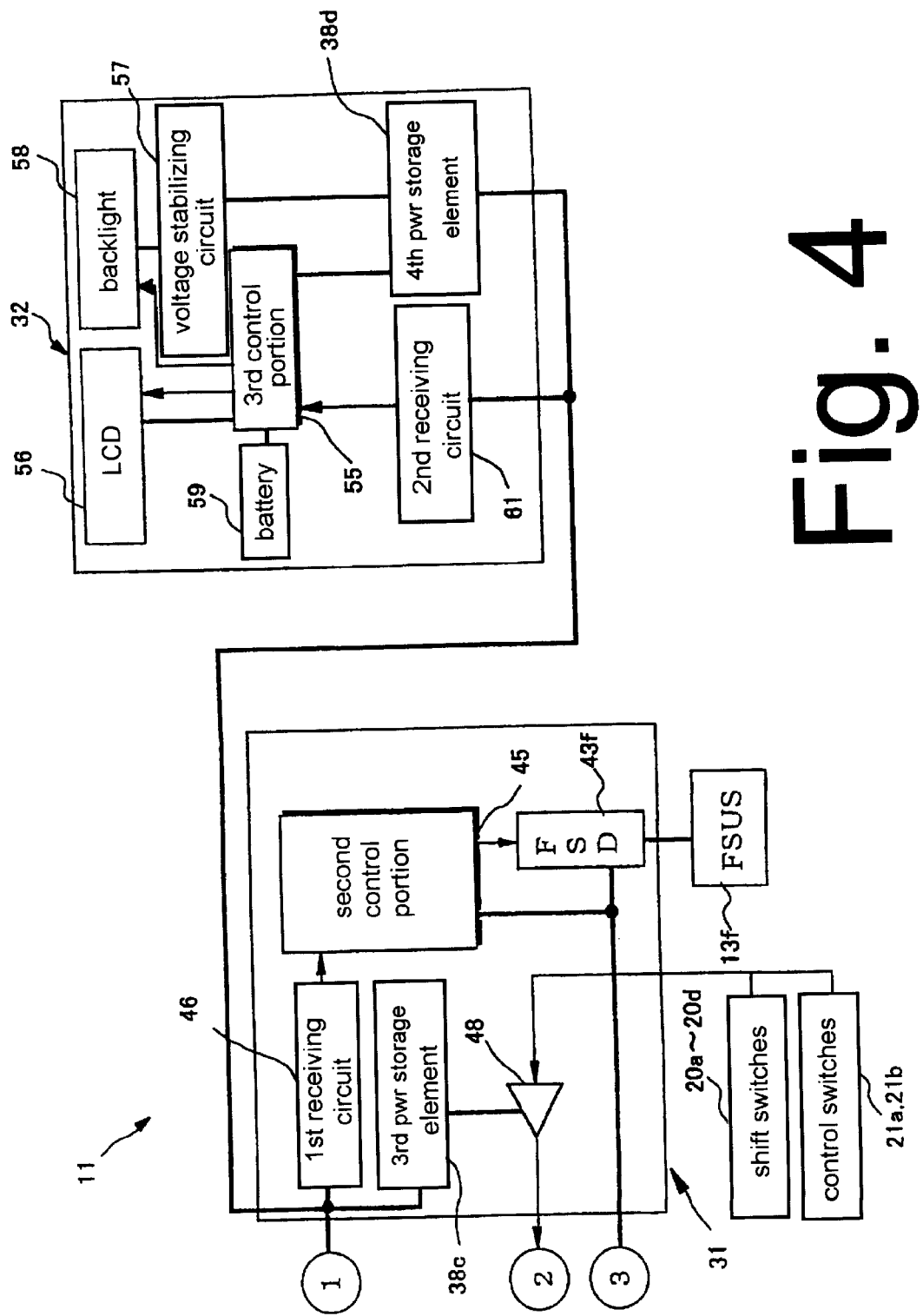

As shown in FIGS. 3 and 4, controller 11 comprises a first control unit 30, a second control unit 31, and a third control unit 32. First control unit 30 may be mounted, for example, on the bottom bracket of frame body 2 in proximity to the rotation sensor and front derailleur 26f, and it is connected to alternating current generator 19. The electrical current generated by alternating current generator 19 powers first control unit 30, and first control unit 30 uses the supplied electrical current to control the operation of front derailleur 26f, rear derailleur 26r and rear suspension 13r. First control unit 30 also supplies control signals (e.g., a velocity signal) superimposed on a relatively low current signal (e.g., pulse code modulated (PCM) signals) to second control unit 31 and third control unit 32. Since first control unit 30 is disposed on the bottom bracket of frame body 2, it is fairly close to alternating current generator 19. As a result, a short power cable may be used to connect first control unit 30 to alternating current generator 19, and the communication of power between the two may be carried out with high efficiency.

First control unit 30 controls front transmission 8, rear transmission 9 and rear suspension 13r in accordance with the operating mode set by mode switch 21a. In this embodiment, in automatic mode, front transmission 8 and rear transmission 9 are controlled according to bicycle velocity, and rear suspension 13r may be set in one of two levels (e.g., hard or soft) depending on bicycle velocity. In manual mode, rear transmission 9 is controlled by the operation of shift switches 20a and 20b, front transmission 8 is controlled by the operation of shift switches 20c and 20d, and rear suspension 13r is controlled by the operation of control switch 21b.

First control unit 30 has a first control portion 35 that comprises a microcomputer including a CPU, memory, I/O interface, and the like. First control portion 35 also comprises a shift unit 35a and a prohibiting unit 35b, which may comprise computer programs that operate in a manner discussed below. A number of modules are connected to first control portion 35. Such modules include a waveform shaping circuit 36 for generating a velocity signal from pulses output from alternating current generator 19; a charging control circuit 33; a first power storage element 38a; a second power storage element 38b; the rotation sensor reed switch 23; a power supply and communications circuit 34 that switches on and off a relatively low current signal from second power storage element 38b to second control unit 31 and third control unit 32 and provides the composite power/control PCM signals mentioned above to second control unit 31 and third control unit 32; a power on/off switch 28 that switches on and off a relatively high current signal from first power storage element 38a to second control unit 31; a front motor driver (FMD) 39f for operating a front derailleur motor (FDM) 44f for front derailleur 26f, a rear motor driver (RMD) 39r for operating a rear derailleur motor (RDM) 44r for rear derailleur 26r, a front operating location sensor (FLS) 41f for front derailleur 26f, a rear operating location sensor (RLS) 41r for rear derailleur 26r, and a rear suspension driver (RSD) 43r for operating rear suspension 13r.

Second control unit 31 controls front suspension 13f in response to control signals sent by first control unit 30. More specifically, in automatic mode the hardness of front suspension 13f is adjusted depending on bicycle velocity, whereas in manual mode the hardness of front suspension 13f is adjusted in response to the operation of control switch 21b. Second control unit 31 also provides control information from switches 20a–20d, 21a and 21b to first control unit 30. For that purpose, second control unit 31 includes a third power storage element 38c, a front suspension driver (FSD) 43f for operating front suspension 13f, a second control portion 45 such as a microcomputer, a first receiving circuit 46 for receiving composite power/control signals from power supply and communications circuit 34 in first control unit 30, and a buffer 48. As shown in FIG. 2, second control unit 31 is attached to handlebar 15 of handlebar assembly 4 by means of a bracket 50.

Third control unit 32 functions as a traditional cycle computer, and it is detachably installed on second control unit 31. Third control unit 32 has a liquid crystal display (LCD) 56 that displays travel information such as bicycle velocity, cadence, distance traveled, shift position, suspension status, and other information. LCD 56 operates in response to control signals output by first control unit 30. For that purpose, third control unit 32 also includes a fourth power storage element 38d, a third control portion 55 such as a microcomputer, a voltage stabilizing circuit 57, a backlight 58 for illuminating display 56, a battery 59 such as a button cell, and a second receiving circuit 61 for receiving composite power/control signals from power supply and communications circuit 34 in first control unit 30. With this arrangement, third control unit 32 can operate even when it is detached from second control unit 31. This allows various initial settings, such as wheel diameter, to be set, as well as allowing data of various kinds such as travel distance, travel time, etc. to be stored.

Returning to first control unit 30, travel data of various kinds is stored in memory in first control portion 35, as well as control data used to control front transmission 8, rear transmission 9, front suspension 13f, rear suspension 13r and LCD 56. As shown in FIGS. 12 and 13, such stored control data may include, for example, upshift threshold values U (F, R) (FIG. 12) and downshift threshold values D (F, R) (FIG. 13), for controlling the shifting of front transmission 8 and rear transmission 9 based the combination of bicycle velocity and the front and rear sprockets F1–F3 and R1–R8 engaged by chain 29. In this embodiment, upshift threshold values U (F, R) and downshift threshold values D (F, R) are provided in nine tables labeled Table 4 to Table –4 to accommodate rider preference and riding conditions. For example, in FIG. 12, Table 0, the timing at which upshifting occurs with the chain 29 engaged on front sprocket F2 and rear sprocket R3 (U (F2, R3)) is 11.66. Downshift threshold values given in FIG. 13 are analogous.

Second power storage element 38b is connected to first power storage element 38a through a diode 42. Diode 42 causes electrical current to flow in one direction only from first power storage element 38a to second power storage element 38b. In other words, diode 42 prevents reverse current flow from second power storage element 38b to first power storage element 38a. In this embodiment, first power storage element 38a is employed mainly as a power supply for electrical components with high power consumption and high electrical capacity, such as drivers 39f, 39r, 43f and 43r, whereas second power storage element 38b is employed as a power supply for electrical components having low power consumption and low electrical capacity, such as first control portion 35, third control portion 55, and LCD 56. First and second power storage elements 38a and 38b may comprise high-capacity capacitors, such as electric double layer capacitors. These capacitors store direct current power output from alternating current generator 19 and rectified by charging control circuit 33. Of course, instead of capacitors, first and second power storage elements 38a and 38b could comprise secondary cells, such as nickel-cadmium, lithium ion, or nickel hydrogen cells.

Charging control circuit 33 comprises a rectifier circuit 37 and a charge on/off switch 40. Rectifier circuit 37 rectifies current output from alternating current generator 19 to produce DC current, and charge on/off switch 40 switches on and off the current output by the rectifier circuit 37 in response to control signals from first control portion 35. More specifically, first control portion 35 monitors the voltage of first power storage element 38a. Below a predetermined voltage (e.g., 5.5V), first control portion 35 outputs a control signal for switching on the charge on/off switch 40, thus allowing first power storage element 38a to charge. On the other hand, if the voltage of first power storage element 38a goes above a predetermined voltage (e.g., 7 V), first control portion 35 outputs a control signal for switching off the charge on/off switch 40, thereby preventing excessive voltage from accumulating in first power storage element 38a.

Power on/off switch 28 is connected to first power storage element 38a and to first control portion 35. Power is switched on to activate second control portion 45 and FSD 43f when it is necessary to adjust front suspension 13f, but power is switched off otherwise. As a result, needless power consumption from first power storage element 38a can be avoided.

Power supply and communications circuit 34 is connected to second storage element 38b and to first control portion 35. As noted above, power supply and communications circuit 34 switches on and off a relatively low current signal from second power storage element 38b to second control unit 31 and third control unit 32 and provides composite power/control signals to second control unit 31 and third control unit 32. Power supply and communications circuit 34 is controlled in response to information such as velocity, distance traveled, current transmission gear, automatic vs. manual modes, suspension hardness and the like.

As shown in FIG. 4, first receiving circuit 46 in second control unit 31 is connected to power supply and communication circuit 34. First receiving circuit 46 extracts the control signals from the composite power/control signals from power supply and communication circuit 34 and communicates the control signals to second control portion 45. Third power storage element 38c also is connected to power supply and communications circuit 34. Third power storage element 38c may comprise, for example, a relatively high capacity capacitor such as an electrolytic capacitor, and it is provided to smooth the electrical current from the composite power/control signals received from power supply and communications circuit 34. Third power storage element 38c provides operating power to buffer 48 that functions to stabilize the analog voltage signals from shift switches 20a–20db and control switches 21a and 21b.

Second receiving circuit 61 and fourth power storage element 38d in third control unit 32 also are connected to power supply and communication circuit 34 (in parallel with first receiving circuit 46). Second receiving circuit 61 extracts the control signals from the composite power/control signals from power supply and communication circuit 34 and communicates the control signals to third control portion 55. Fourth power storage element 38d may comprise an electrolytic capacitor that provides operating power directly to third control portion 55 and indirectly to backlight 58 through voltage stabilizing circuit 57. Voltage stabilizing circuit 57 stabilizes the voltage from fourth power storage element 38d to avoid flickering of backlight 58 that otherwise may be caused by the pulsed control signals superimposed on the power signals from power supply and communications circuit 34.

Figure 5:
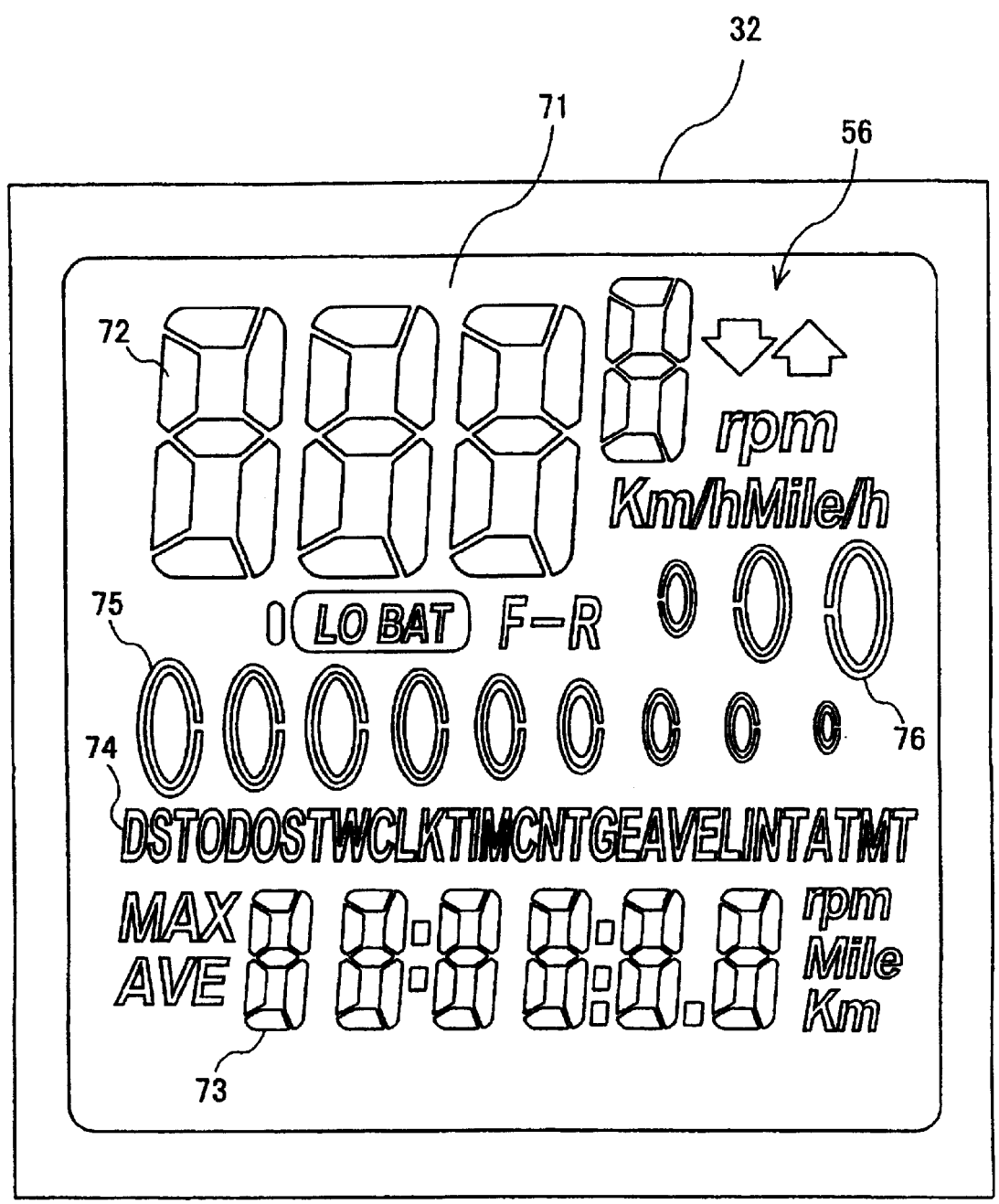
FIG. 5 is an illustration of items displayed on the computer display.
Figure 6:
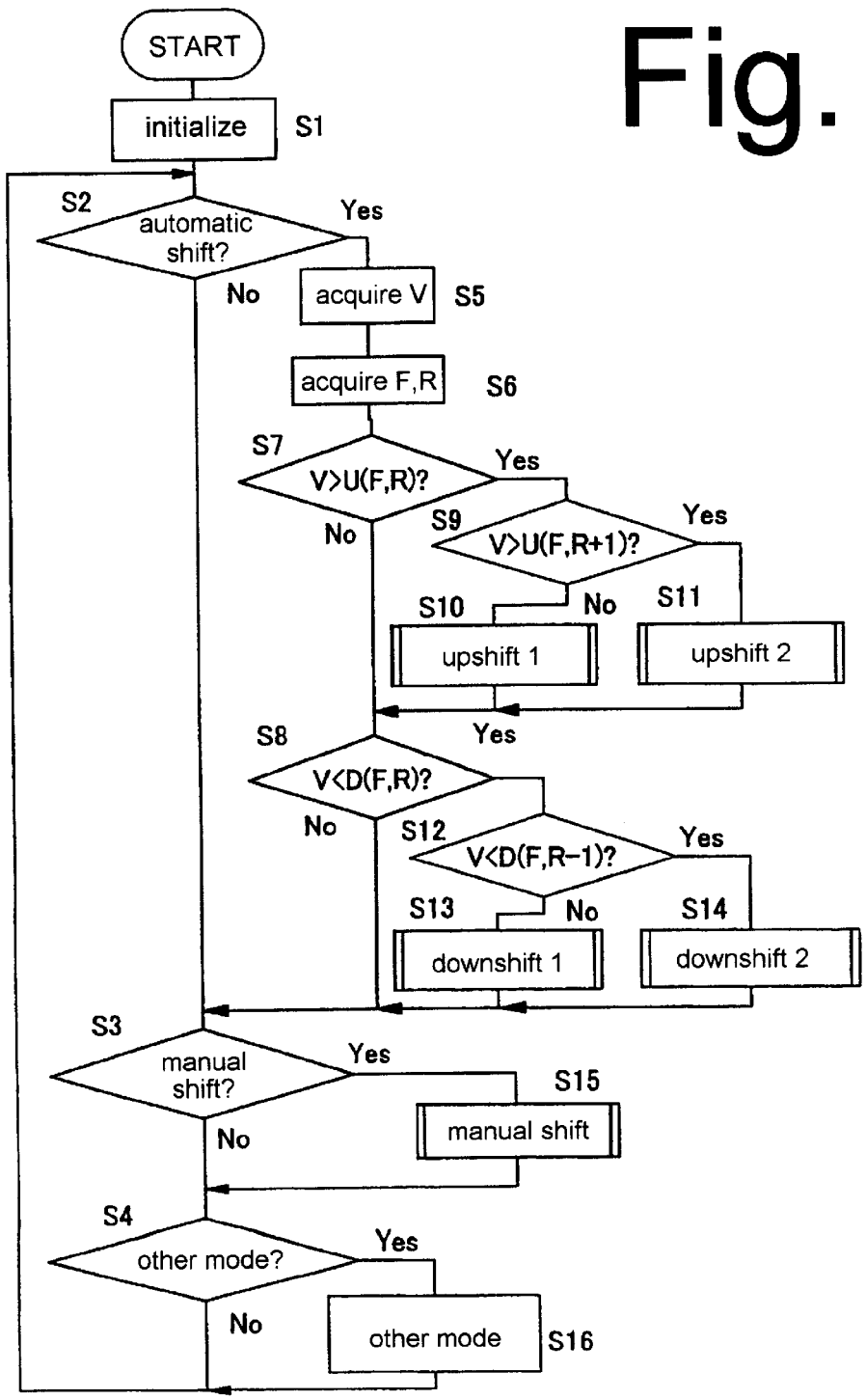
FIG. 6 is a flow chart of a particular embodiment of a main processing routine.

FIG. 5 illustrates an embodiment of information that may be shown on a display screen 71 of LCD 56. In this embodiment, display screen 71 comprises a main number display portion 72, an auxiliary number display portion 73, a description display portion 74, a rear gear position display portion 75, and a front gear position display portion 76. Information such as bicycle velocity, time, etc. is displayed in numerical format in main number display portion 72 and auxiliary number display portion 73. Description display portion 74 displays a description of the contents of main number display portion 72 and auxiliary number display portion 73, as well as showing the transmission operating mode. For example, "VEL" indicates travel velocity, "DST" indicates distance traveled, "CLK" indicates current time, "TIM" indicates travel time, and "GEA" indicates current shift position of the front and rear transmissions, "AT" indicates automatic shift mode, "MT" indicates manual shift mode, and so on. The unit of velocity can be switched between "Km/h" and "Mile/h", and the unit of distance can be switched between "Km" and "Mile."

The rear gear position display portion 75 shows the gear position of the rear transmission 9, and it comprises a plurality of (e.g., nine) elliptical display symbols gradually decreasing in diameter from left to right to correspond with the size of the actual rear sprockets R1–R8 . When initializing LCD 56, the number of sprockets for rear transmission 9 can be set to match the actual number of sprockets installed on the bicycle. For example, when rear transmission 9 has eight sprockets, as in this embodiment, the number of rear sprockets is input to the cycle computer. Thereafter, eight elliptical display symbols are displayed from left to right in rear gear position display portion 75, with the one remaining symbol at the right end not displayed. Similarly, the front gear position display portion 76 shows the gear position of the front transmission 8, and it comprises a plurality of (e.g., three) elliptical display symbols gradually increasing in diameter from left to right to correspond with the size of the actual front sprockets F1–F3 . When initializing LCD 56, the number of sprockets for front transmission 8 can be set to match the actual number of sprockets installed on the bicycle. For example, when front transmission 8 has two sprockets, the number of front sprockets is input to the cycle computer. Thereafter, two elliptical display symbols are displayed from right to left in front gear position display portion 76, with the one remaining symbol at the left end not displayed. As a result of this arrangement, the sprocket positions of front and rear transmissions 8 and 9 may be ascertained intuitively at a glance.

In operation, the alternating current generator 19 of hub dynamo 10 generates electricity as the bicycle is pedaled, and this electricity is supplied to first control unit 30, with power being stored by first and second power storage elements 38a and 38b. Since alternating current generator 19 is disposed on rear wheel 7, first and second power storage elements 38a, 38b can be charged simply by turning the pedals, with the bicycle remaining stationary, by lifting the rear wheel. Thus, it is a simple matter to at least partially charge first and second power storage elements 38a, 38b by turning the pedals to allow setting up of the electronically operated transmissions and the information displayed on LCD 56.

In automatic shift mode, derailleurs 26f and 26r and suspensions 13f and 13r are controlled according to a velocity signal generated by first control portion 35 from the shaped pulse output by waveform shaping circuit 36. More specifically, a shift operation is performed when the bicycle velocity is greater or less than predetermined values, such as the values shown in FIGS. 12 and 13 discussed above. The rear derailleur 26r is given preference in ordinary shift operations. Also, when velocity goes above a predetermined value, the hardness of the suspensions 13f and 13r is increased.

Control signals based on information such as velocity, distance, transmission gear, automatic vs. manual modes, suspension hardness, and the like, are generated by first control portion 35 and output to power supply communications circuit 34. Power supply and communications circuit 34 superimposes the control signals on a power signal derived from second power storage element 38b to produce the appropriate PCM signals. The composite power/control signals are then communicated to second control portion 45 and third control portion 55, where-upon the composite power/control signals are decoded.

Second control portion 45 is powered by power signals received from power on/off switch 28 and outputs to RSD 43f signals for controlling front suspension 13f in response to the control signal portion of the composite power/control signals received from power supply and communications circuit 34. The power signal portion of the composite power/control signals received from power supply and communications circuit 34 powers buffer amp 48. When a control switch 21a or 21b or a shift switch 20a–20d is operated, a signal of different analog voltage is output to first control portion 35 via buffer amp 48, and first control portion 35 generates the appropriate control signals for controlling one or more of derailleurs 26f and 26r or suspensions 13f and 13r, or for changing the transmission operating mode.

Third control portion 55 is powered by the power signal portion of the composite power/control signals received from power supply and communications circuit 34. Third control portion 55 performs distance calculations and the like based on the control signal portion of the composite power/control signals received from power supply and communications circuit 34 and thereafter outputs to LCD 56 velocity and other kinds of information.

When driving a motor-driven electrical component having large electrical capacity, such as derailleurs 26f and 26r or suspensions 13f and 13r, there is a voltage drop in first power storage element 38a. If first control portion 35, third control portion 55 and LCD 56 were powered by first power storage element 38a, the voltage drop could cause the microprocessors and other electronics to reset or cause some other problem. Since the power for these components in this embodiment is provided from second power storage element 38b connected to first power storage element 38a through diode 42, the components are unaffected by voltage drops in first power storage element 38a. While second control portion 45 is powered by first power storage element 38a, it is normally off except when needed to control front suspension 13f. Consequently, second control portion 45 is unaffected by voltage drops in first power storage element 38a.

More specific operations of first control unit 30 will now be described with reference to FIGS. 6–11. When rear wheel 7 turns, alternating current generator 19 supplies electrical power to first control unit 30, and this power is stored in first power storage element 38a and second power storage element 38b. The power stored in second power storage element 38b is supplied to first control portion 35, and initialization of first control portion 35 is carried out in Step S1 of FIG. 6. In this initialization process, the transmission operating mode may be set to automatic shift mode, for example. In Step S2 it is determined whether or not the system is in automatic shift mode, and in Step S3 it is determined whether or not the system is in manual shift mode. In Step S4 it is determined whether or not any other mode has been requested. Such modes may be used for adjusting the hardness of front and rear suspensions 13f and 13r, changing the information displayed on LCD 56, setting shift threshold values, and so on.

If it is determined in Step S2 that the system is in automatic shift mode, then processing moves to Step S5. In Step S5, the current bicycle velocity V, calculated on the basis of signals output by alternating current generator 19 and shaped by waveform shaping circuit 36, is acquired. Then, the current sprockets F, R engaged by front and rear transmissions 8 and 9 are acquired from the operating position sensors 41f and 41r associated with the derailleurs 26f and 26r. In this embodiment, variable F indicates the operating position of front derailleur 26f and can vary between 1 and 3. Variable R indicates the operating position of rear derailleur 26*r* and can vary between 1 and 8.

In Step S7 it is determined whether or not the bicycle velocity V is above an upshift threshold value U (F, R) for the current sprocket combination as shown in FIG. 12. In Step S8 it is determined whether or not the bicycle velocity V is below a downshift threshold value D (F, R) for the current sprocket combination as shown in FIG. 13. In these steps, the pulse interval corresponding to velocity V output by waveform shaping circuit 36 is compared with the pulse interval corresponding to the relevant threshold value. Since the pulse intervals vary according to the bicycle velocity V, the decision whether or not the threshold value has been passed is made depending on whether the pulse interval corresponding to velocity V is shorter (velocity V is faster) or longer (velocity V is slower) than the pulse interval corresponding to the threshold value.

Figure 7:
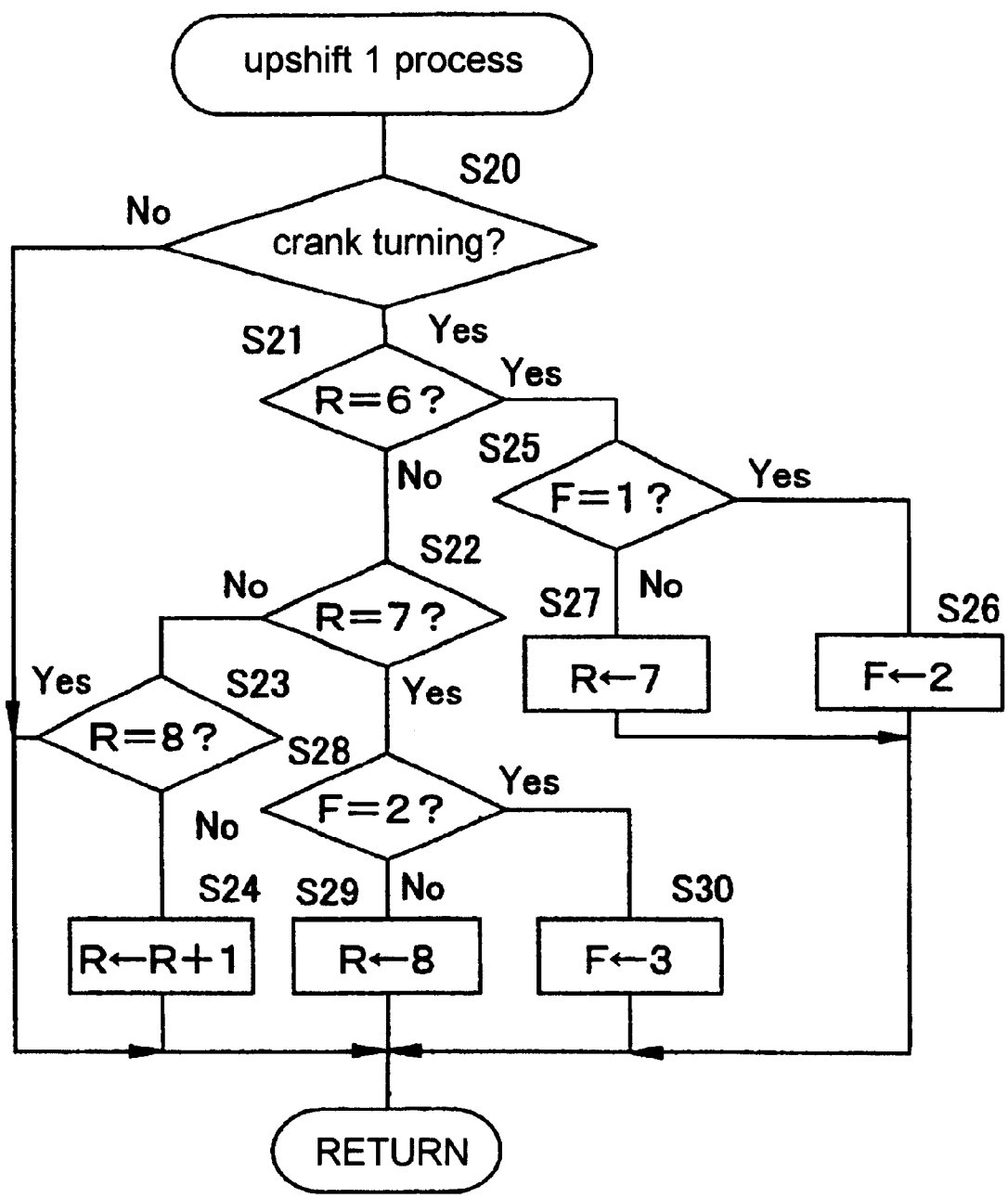
FIG. 7 is a flow chart of a particular embodiment of an Upshift 1 process.
Figure 8:
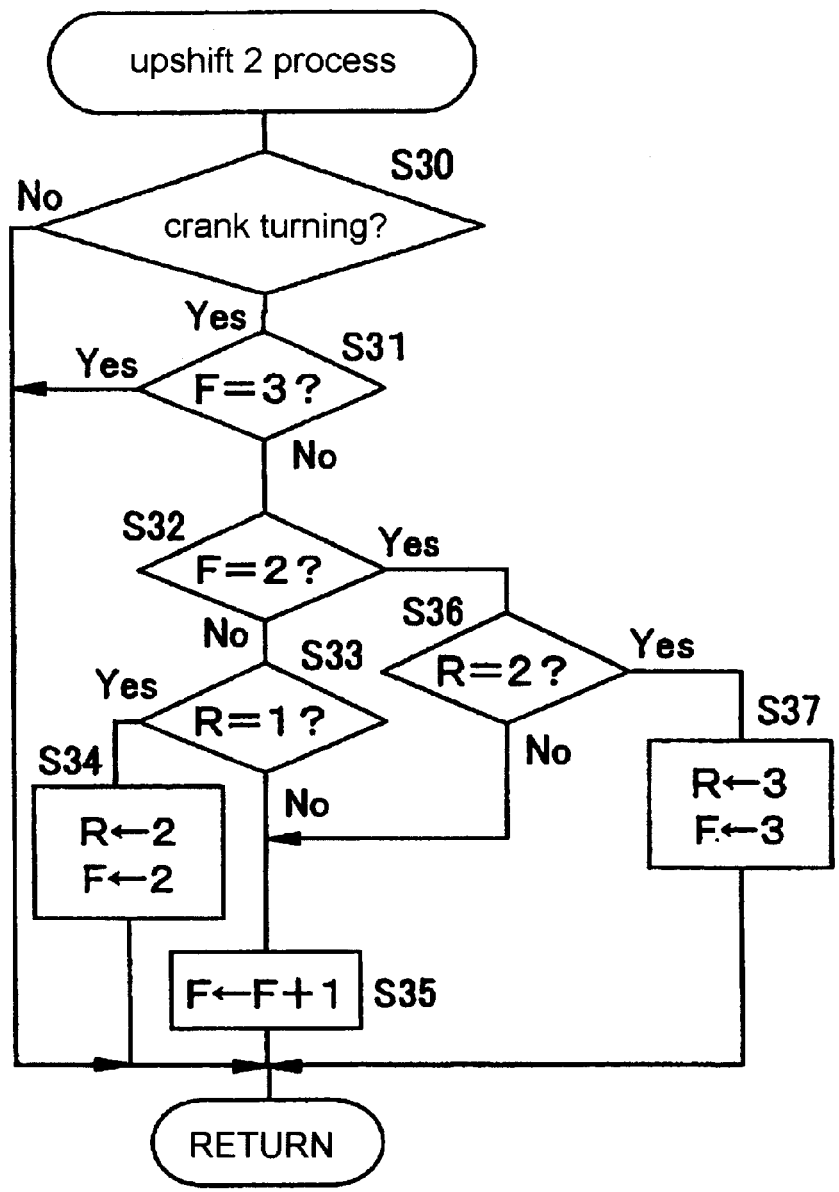
FIG. 8 is a flow chart of a particular embodiment of an Upshift 2 process.

If it is determined in Step S7 that the bicycle velocity V exceeds the upshift threshold value U (F, R) for the current sprocket combination, processing moves to Step S9, and it is determined whether or not the bicycle velocity V is above an upshift threshold value U (F, R+1) established for the combination of front sprocket F and the smaller rear sprocket R+1 adjacent to the current rear sprocket. If so, then the bicycle is accelerating rapidly, and the Upshift 2 process shown in FIG. 8 is performed in Step S11, thus giving preference in shifting to front transmission 8. If the bicycle velocity V is not above the upshift threshold value U (F, R+1), then the Upshift 1 process shown in FIG. 7 is performed in Step S10, thus giving preference in shifting to rear transmission 9.

Figure 9:
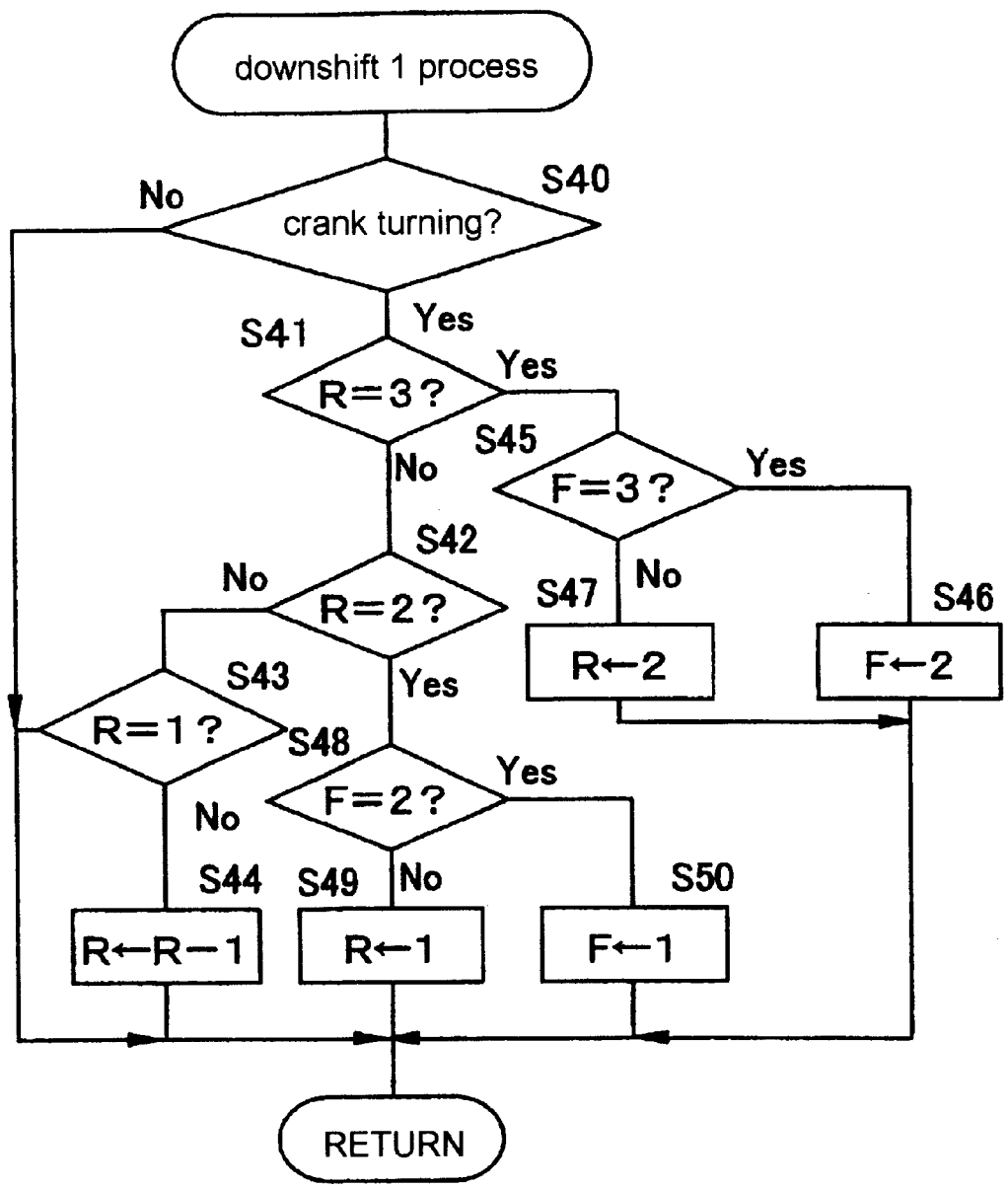
FIG. 9 is a flow chart of a particular embodiment of a Downshift 1 process.
Figure 10:
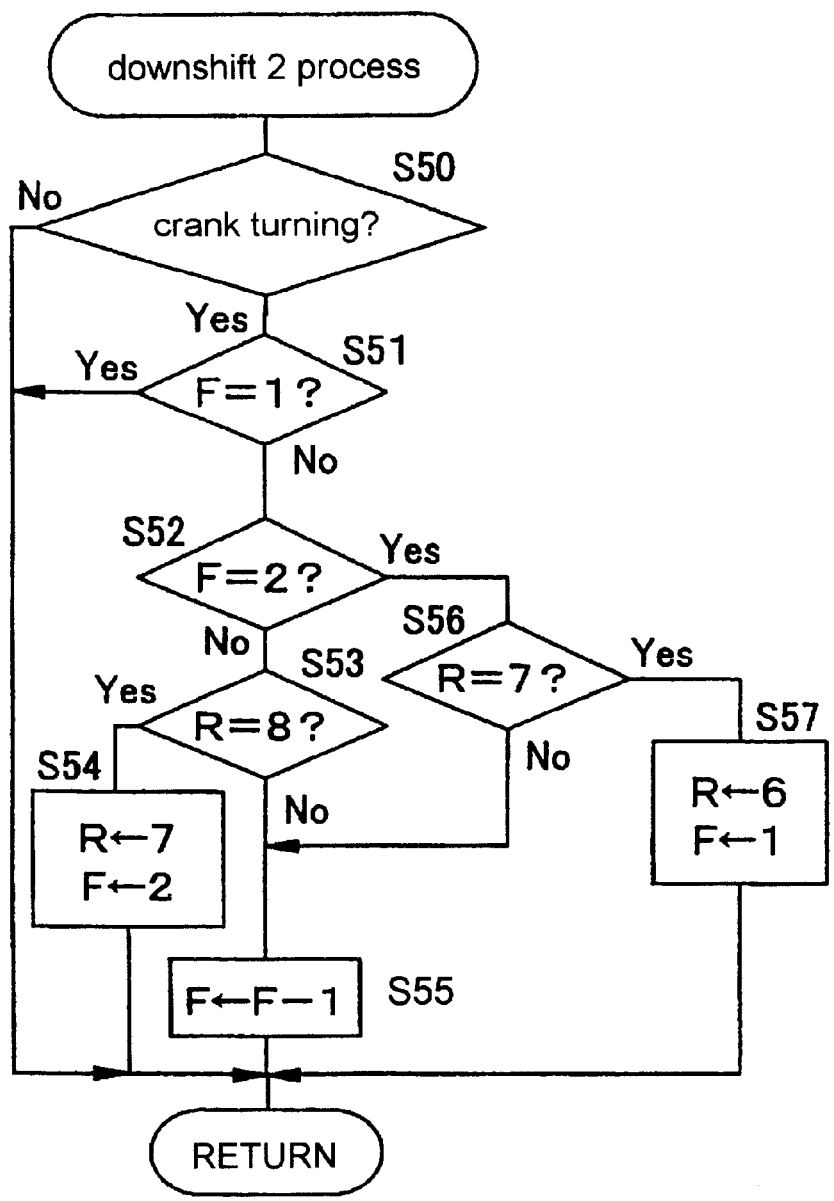
FIG. 10 is a flow chart of a particular embodiment of a Downshift 2 process.

If it is determined in Step S8 that the bicycle velocity V is below the downshift threshold value D (F, R) for the current sprocket combination, then processing moves Step S12, and it is determined whether or not the bicycle velocity V is below a downshift threshold value D (F, R−1) established for the combination of front sprocket F with the larger rear sprocket R−1 adjacent to the current rear sprocket. If so, then the bicycle is decelerating rapidly, and the Downshift 2 process shown in FIG. 10 is performed in Step S14, giving priority to shifting the front transmission 8. If the bicycle velocity V is not below the downshift threshold value D (F, R−1), then the Downshift 1 process shown in FIG. 9 is performed in Step 13, giving priority to shifting the rear transmission 9. Thus, in the case of rapid acceleration or deceleration, i.e. a sudden change in bicycle velocity, shifting is performed giving priority to the front transmission 8 rather than the rear transmission 9 in order to produce a large change of gear ratio.

Figure 11:
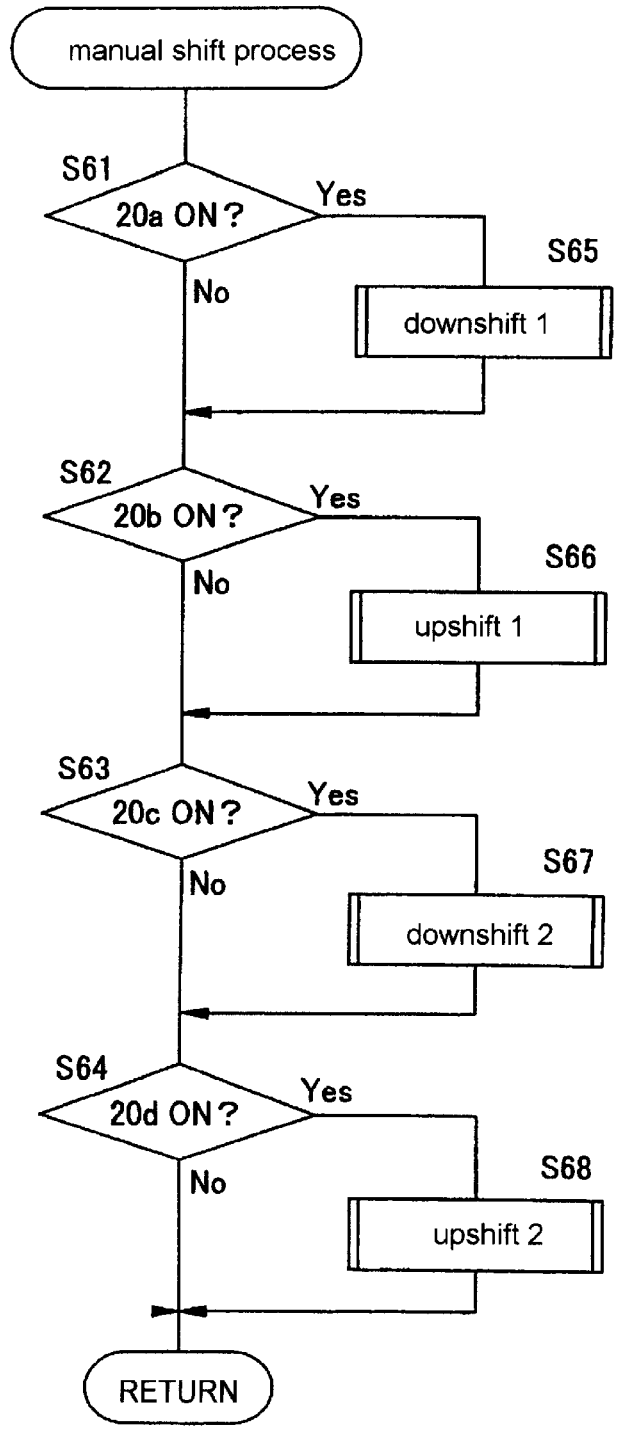
FIG. 11 is a flow chart of a particular embodiment of a manual shift process.

If it is determined in Step S3 that the system is in manual shift mode, then processing moves to Step S15, and the manual shift process shown in FIG. 11 is performed. If it is determined in Step S4 that the system is in another mode, then processing moves to Step S16, and the selected other mode process is performed.

In this embodiment, in order to prevent undesirable inclination of chain 29, the engagement of chain 29 with various sprocket combinations is prohibited. For example, in the Upshift 1 process, three combinations may be prohibited. Those sprocket combinations are the combination of front sprocket F1 (the front sprocket having the least number of teeth) with rear sprocket R7 (the rear sprocket having the second least number of teeth); the combination of front sprocket F1 with rear sprocket R8 (the rear sprocket having the least number of teeth); and the combination of front sprocket F2 (the front sprocket having the intermediate number of teeth) with sprocket R8. In the Downshift 1 process, three combinations also may be prohibited. Those sprocket combinations are the combination of front sprocket F3 (the front sprocket having the most number of teeth) with sprocket R1 (the rear sprocket having the most number of teeth); the combination of front sprocket F3 with rear sprocket R2 (the rear sprocket having the second most number of teeth); and the combination of front sprocket F2 with rear sprocket R1.

FIG. 7 is a flow chart of a particular embodiment of the Upshift 1 process. As a general rule, preferably only rear derailleur 26*r* is upshifted in this routine. However, where necessary to avoid a prohibited sprocket combination, front derailleur 26*f* may be upshifted instead.

Initially, a decision is made in Step S20 whether or not crank 27 is turning. This decision is made because, with derailleur-based transmissions, shifting is not desirable unless crank 27 is turning. Whether or not crank 27 is turning is ascertained by whether or not pulses are output from reed switch 23. If crank 27 is not turning, then processing simply returns to the main routine. On the other hand, if it is determined in Step S20 that crank 27 is turning, then processing moves to Step S21, and it is determined whether or not rear derailleur 26*r* is positioned at rear sprocket R6. If so, then processing moves to Step S25, and it is determined whether or not front derailleur 26*f* is positioned at front sprocket F1. If so, then processing moves to Step S26, and front derailleur 26*f* upshifts to front sprocket F2 to avoid the prohibited combination of front sprocket F1 and rear sprocket R7 (and consequently the prohibited combination of front sprocket F1 and rear sprocket R8) if rear derailleur 26*r* were to be upshifted from rear sprocket R6. The process then returns to the main routine. If it is determined in Step S25 that front derailleur 26*f* is not positioned at front sprocket F1, then processing moves to Step S27, rear derailleur 26*r* upshifts to rear sprocket R7, and the process returns to the main routine.

If it is determined in Step S21 that rear derailleur 26*r* is not positioned at rear sprocket R6, then processing moves to Step S22, and it is determined whether or not rear derailleur 26*r* is positioned at rear sprocket R7. If not, then processing moves to Step S23, and it is determined whether or not rear derailleur 26*r* is positioned at sprocket R8. If so, then processing returns to the main routine because further upshifting of rear derailleur 26*r* is not possible. If it is determined in Step S23 that rear derailleur 26*r* is not positioned at sprocket R8, then processing moves to Step S24, rear derailleur 26*r* upshifts by one sprocket position, and the process returns to the main routine.

If it is determined in Step S22 that rear derailleur 26*r* is positioned at rear sprocket R7, then processing moves to Step S28, and it is determined whether or not front derailleur 26*f* is positioned at front sprocket F2. If so, then processing moves to Step S30, front derailleur 26*f* upshifts to front sprocket F3 to avoid the prohibited combination of front sprocket F2 and rear sprocket R8 if rear derailleur were to be upshifted from rear sprocket R7, and the process returns to the main routine. If it is determined in Step S28 that front derailleur 26*f* is not positioned at front sprocket F2, then processing moves to Step S29, rear derailleur 26*r* upshifts to rear sprocket R8, and the process returns to the main routine.

FIG. 8 is a flow chart of a particular embodiment of the Upshift 2 routine. As a general rule, preferably only front derailleur 26*f* is upshifted in this routine. However, where necessary to avoid a prohibited sprocket combination, rear derailleur 26*r* may be shifted in addition to front derailleur 26*f*.

As shown in FIG. 8, it is first determined in Step S30 whether or not crank 27 is turning. If not, then processing returns to the main routine. If so, then processing moves to Step S31, and it is determined whether or not front derailleur 26f is positioned at front sprocket F3. If so, then processing returns to the main routine, since further upshifting of front derailleur 26f is not possible. If not, then processing moves to Step S32, and it is determined whether or not front derailleur 26f is positioned at front sprocket F2. If so, then processing moves to Step S36, and it is determined whether or not rear derailleur 26r is positioned at rear sprocket R2. If so, then processing moves to Step S37, rear derailleur 26r upshifts to rear sprocket R3, and front derailleur 26f upshifts to front sprocket F3 to avoid the prohibited combination of front sprocket F3 and rear sprocket R2 (and consequently the prohibited combination of front sprocket F3 and rear sprocket R1) if front derailleur 26f were to be upshifted from front sprocket F2. The process then returns to the main routine. If it is determined in Step S36 that rear derailleur 26r is not positioned at rear sprocket R2, then processing moves to Step S35, front derailleur 26f upshifts by one sprocket, and the process returns to the main routine.

If it is determined in Step S32 that front derailleur 26f is not positioned at front sprocket F2, then front derailleur 26f is positioned at front sprocket F1. At this time, processing moves to Step S33, and it is determined whether or not rear derailleur 26r is positioned at rear sprocket R1. If so, then processing moves to Step S34, rear derailleur 26r upshifts to rear sprocket R2, and front derailleur 26f upshifts to front sprocket F2 to avoid the prohibited combination of front sprocket F2 with rear sprocket R1 if front derailleur 26f were to be upshifted from front sprocket F1. The process then returns to the main routine. If it is determined in Step S33 that rear derailleur 26r is not positioned at rear sprocket R1, then processing moves to Step S35, front derailleur 26f upshifts by one sprocket, and the process returns to the main routine.

FIG. 9 is a flow chart of a particular embodiment of the Downshift 1 routine. As a general rule, preferably only rear derailleur 26r is downshifted in this routine. However, where necessary to avoid a prohibited sprocket combination, front derailleur 26f may be downshifted instead.

As in the previous routines, it is first determined in Step S40 whether or not crank 27 is turning. If not, then processing returns to the main routine. If crank 27 is turning, then processing moves to Step S41, and it is determined whether or not rear derailleur 26r is positioned at rear sprocket R3. If so, then processing moves to Step S45, and it is determined whether or not front derailleur 26f is positioned at front sprocket F3. If so, then processing moves to Step S46, and front derailleur 26f downshifts to front sprocket F2 to avoid the prohibited combination of front sprocket F3 with rear sprocket R2 (and consequently the prohibited combination of front sprocket F3 and rear sprocket R1) if rear derailleur 26r were to be downshifted from rear sprocket R3. Processing then returns to the main routine. If it is determined in Step S45 that front derailleur 26f is not positioned at front sprocket F3, then processing moves to Step S47, rear derailleur 26r downshifts to rear sprocket R2, and the process returns to the main routine.

If it is determined in Step S41 that rear derailleur 26r is not positioned at rear sprocket R3, then processing moves to Step S42, and it is determined whether or not rear derailleur 26r is positioned at rear sprocket R2. If not, then processing moves to Step S43, and it is determined whether or not rear derailleur 26r is positioned at rear sprocket R1. If so, then processing returns to the main routine, since no further downshifting of rear derailleur 26r is possible. If it is determined in Step S43 that rear derailleur 26r is not positioned at rear sprocket R1, then processing moves to Step S44, rear derailleur 26r downshifts by one sprocket, and the process returns to the main routine.

If it is determined in Step S42 that rear derailleur 26r is positioned at rear sprocket R2, then processing moves to Step S48, and it is determined whether or not front derailleur 26f is positioned at front sprocket F2. If so, then processing moves to Step S50, and front derailleur 26f downshifts to front sprocket F1 to avoid the prohibited combination of front sprocket F2 with rear sprocket R1 if rear derailleur were to be downshifted from rear sprocket R2. If it is determined in Step S48 that front derailleur 26f is not positioned at front sprocket F2, then processing moves to Step S49, rear derailleur 26r downshifts to sprocket R1, and the process returns to the main routine.

FIG. 10 is a flow chart of a particular embodiment of the Downshift 2 routine. As a general rule, preferably only front derailleur 26f is downshifted in this routine. However, where necessary to avoid a prohibited sprocket combination, rear derailleur 26r may be shifted in addition to front derailleur 26f.

As in the previous routines, it is first determined in Step S50 whether or not crank 27 is turning. If not, then processing returns to the main routine. If crank 27 is turning, then processing moves to Step S51, and it is determined whether or not front derailleur 26f is positioned at front sprocket F1. If so, then processing returns to the main routine, since further downshifting of front derailleur 26f is not possible. If not, then processing moves to Step S52, and it is determined whether or not front derailleur 26f is positioned at front sprocket F2. If so, then processing moves to Step S56, and it is determined whether or not rear derailleur 26r is positioned at rear sprocket R7. If so, then processing moves to Step S57, rear derailleur 26r downshifts to rear sprocket R6, and front derailleur 26f downshifts to front sprocket F1 to avoid the prohibited combination of front sprocket F1 with rear sprocket R7 (and consequently the prohibited combination of front sprocket F1 with rear sprocket R8) if front derailleur 26f were to be downshifted from front sprocket F2. The process then returns to the main routine. If it is determined in Step S56 that rear derailleur 26r is not positioned at rear sprocket R7 then processing moves to Step S55, front derailleur 26f downshifts by one sprocket, and the process returns to the main routine.

If it is determined in Step S52 that front derailleur 26f is not positioned at front sprocket F2, then front derailleur 26f is positioned at front sprocket F3. At this time, processing moves to Step S53, and it is determined whether or not rear derailleur 26r is positioned at rear sprocket R8. If so, then processing moves to Step S54, rear derailleur 26r downshifts to rear sprocket R7, and front derailleur 26f downshifts to front sprocket F2 to avoid the prohibited combination of front sprocket F2 with rear sprocket R8 if front derailleur 26f were to be downshifted from front sprocket F3. The process then returns to the main routine. If it is determined in Step S53 that rear derailleur 26r is not positioned at rear sprocket R8, then processing moves to Step S55, front derailleur 26f downshifts by one sprocket, and the process returns to the main routine.

FIG. 11 is a flow chart of a particular embodiment of a manual shift routine. As a general rule, when a shift switch 20a or 20b on the right side of handlebar 15 is operated in order to shift the rear derailleur 26r, only the rear derailleur 26r upshifts or downshifts. However, in order to avoid a prohibited sprocket combination, the Upshift 1 process shown in FIG. 7 or the Downshift 1 process shown in FIG. 9 described above may be performed to carry out the desired operation. As a similar general rule, when a shift switch 20c or 20d on the left side of handlebar 15 is operated in order to shift the front derailleur 26f, only the front derailleur 26f upshifts or downshifts. However, in order to avoid a prohibited sprocket combination, the Upshift 2 process shown in FIG. 8 or the Downshift 2 process shown in FIG. 10 described above may be performed to carry out the desired operation.

As shown in FIG. 11, it is first determined in Step S61 whether or not downshift switch 20a has been operated. If so, then processing moves from Step S61 to Step S65, and the Downshift 1 process shown in FIG. 9 is performed. In any event, it is then determined in Step S62 whether or not upshift switch 20b has been operated. If so, then processing moves to Step S66, and the Upshift 1 process shown in FIG. 7 is performed. In any event, it is then determined in Step S63 whether or not downshift switch 20c has been operated. If so, then processing moves to Step S67, and the Downshift 2 process shown in FIG. 10 is performed. In any event, it is then determined in Step S64 whether or not upshift switch 20d has been operated. If so, then processing moves to Step S68, and the Upshift 2 process shown in FIG. 8 is performed.

In the above-described embodiments, sprocket combinations that would result in an undesirable incline of chain 29 with respect to the sprockets are prevented from occurring, not only in automatic shift mode but in manual shift mode as well. As a result, high transfer efficiency between the front and rear transmissions 8 and 9 can be maintained. Undesirable noise and wear caused by excessive friction between chain 29 with the sprockets in such situations also is avoided. Furthermore, since priority is given to the rear derailleur 26r in shifting during ordinary travel conditions, and since priority is given to the front derailleur 26f in shifting during rapid acceleration, excessively frequent shifting of the front transmission 8 in the event of sudden fluctuations in velocity is avoided.

While the above is a description of various embodiments of inventive features, further modifications may be employed without departing from the spirit and scope of the present invention. For example, in the embodiment described hereinabove, the front transmission 8 has three sprockets, but the front transmission may have any number of sprockets, with the processing routines modified accordingly. While bicycle velocity was used to determine when to shift the front and rear transmissions 8 and 9, crank rotation speed could be used as well. For example, crank RPM could be detected from the pulsed signals from reed switch 23. In this case, downshifting could be performed if crank RPM is below a downshift threshold value (e.g., 60 RPM), and upshifting could be performed if crank RPM is above an upshift threshold value (e.g., 45 RPM).

In the embodiment described hereinabove, bicycle velocity is derived from signals produced by alternating current generator 19. However, bicycle velocity could be derived from signals produced by conventional velocity sensors comprising a reed switch and magnet that detect wheel rotation.

In the embodiment described above, both front and rear derailleurs 26f and 26r are electrically controlled. However, some applications may need only one electrically controlled derailleur. In this case, it is also possible that shift position information needs to be provided only for the derailleur that is electrically controlled. In any event, shift position information could be sensed by providing a position sensor for sensing derailleur position, by providing a position sensor at the shift control device, or by some other method.

In the embodiment described above, three kinds of sprocket combinations (i.e., (a) F1, R8 and F3, R1, which produce the greatest incline of the chain; (b) F1, R7 and F3, R2, which produce the second-greatest incline of the chain; and (c) F2, R1 and F2, R8) are prohibited. However, other combination of sprockets, such as F1, R8 and/or F3, R1 and/or some other combination, also could be prohibited depending upon the application.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A shift control apparatus for a bicycle having a plurality of front sprockets and a plurality of rear sprockets, wherein a front derailleur shifts a chain among the plurality of front sprockets and a rear derailleur shifts the chain among the plurality of rear sprockets, wherein the apparatus comprises:
 a shift unit that provides signals for shifting the front derailleur and the rear derailleur; and
 a prohibiting unit operatively coupled to the shift unit and providing signals so that the chain is prohibited from engaging at least one prohibited sprocket combination comprising at least one of i) a laterally innermost front sprocket in combination with a laterally outermost rear sprocket, and ii) a laterally outermost front sprocket in combination with a laterally innermost rear sprocket;
 wherein the prohibiting unit detects when the front derailleur and the rear derailleur are positioned such that shifting the front derailleur or the rear derailleur to execute a shift command would cause the front derailleur and the rear derailleur to engage the at least one prohibited sprocket combination.

2. The apparatus according to claim 1 wherein the prohibiting unit cooperates with the shift unit so that the chain is prohibited from engaging the laterally innermost front sprocket in combination with the laterally outermost rear sprocket.

3. The apparatus according to claim 2 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that the chain is prohibited from engaging the second front sprocket in combination with the laterally innermost rear sprocket.

4. The apparatus according to claim 2 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that chain is prohibited from engaging the second front sprocket in combination with the laterally outermost rear sprocket.

5. The apparatus according to claim 2 wherein the prohibiting unit cooperates with the shift unit so that the chain is prohibited from engaging the laterally innermost front sprocket in combination with a rear sprocket adjacent to the laterally outermost rear sprocket.

6. The apparatus according to claim 5 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that the chain is prohibited from engaging the second front sprocket in combination with the laterally innermost rear sprocket.

7. The apparatus according to claim 5 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that chain is prohibited from engaging the second front sprocket in combination with the laterally outermost rear sprocket.

8. The apparatus according to claim 1 wherein the prohibiting unit cooperates with the shift unit so that the chain is prohibited from engaging the laterally outermost front sprocket in combination with the laterally innermost rear sprocket.

9. The apparatus according to claim 8 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that the chain is prohibited from engaging the second front sprocket in combination with the laterally innermost rear sprocket.

10. The apparatus according to claim 8 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that chain is prohibited from engaging the second front sprocket in combination with the laterally outermost rear sprocket.

11. The apparatus according to claim 8 wherein the prohibiting unit cooperates with the shift unit so that the shift unit prohibits the chain from engaging the laterally outermost front sprocket in combination with a rear sprocket adjacent to the laterally innermost rear sprocket.

12. The apparatus according to claim 11 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that the chain is prohibited from engaging the second front sprocket in combination with the laterally innermost rear sprocket.

13. The apparatus according to claim 11 wherein the plurality of front sprockets comprises a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that chain is prohibited from engaging the second front sprocket in combination with the laterally outermost rear sprocket.

14. The apparatus according to claim 1 wherein the prohibiting unit cooperates with the shift unit so that the chain is prohibited from engaging i) a laterally innermost front sprocket in combination with a laterally outermost rear sprocket, and ii) a laterally outermost front sprocket in combination with a laterally innermost rear sprocket.

15. The apparatus according to claim 14 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that the chain is prohibited from engaging the second front sprocket in combination with the laterally innermost rear sprocket.

16. The apparatus according to claim 14 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that chain is prohibited from engaging the second front sprocket in combination with the laterally outermost rear sprocket.

17. The apparatus according to claim 14 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that the chain is prohibited from engaging i) the second front sprocket in combination with the laterally innermost rear sprocket, and ii) the second front sprocket in combination with the laterally outermost rear sprocket.

18. The apparatus according to claim 14 wherein the prohibiting unit cooperates with the shift unit so that the chain is prohibited from engaging i) the laterally innermost front sprocket in combination with a rear sprocket adjacent to the laterally outermost rear sprocket, and ii) the laterally outermost front sprocket in combination with a rear sprocket adjacent to the laterally innermost rear sprocket.

19. The apparatus according to claim 18 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that the chain is prohibited from engaging the second front sprocket in combination with the laterally innermost rear sprocket.

20. The apparatus according to claim 18 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that chain is prohibited from engaging the second front sprocket in combination with the laterally outermost rear sprocket.

21. The apparatus according to claim 20 wherein the plurality of front sprockets comprise a first front sprocket, a second front sprocket and a third front sprocket, wherein the first front sprocket comprises the laterally innermost front sprocket, wherein the third front sprocket comprises the laterally outermost front sprocket, wherein the second front sprocket is disposed between the first front sprocket and the third front sprocket, and wherein the prohibiting unit cooperates with the shift unit so that the chain is prohibited from engaging i) the second front sprocket in combination with the laterally innermost rear sprocket, and ii) the second front sprocket in combination with the laterally outermost rear sprocket.

22. The apparatus according to claim 1 further comprising riding condition sensing means for sensing a riding condition of the bicycle, wherein the shift unit cooperates with the riding condition sensing means to automatically operate the front derailleur and the rear derailleur in accordance with the riding condition.

23. The apparatus according to claim 1 further comprising a manually operated shift control device that provides shift command signals to the shift unit, wherein the shift unit operates the front derailleur and the rear derailleur in response to the shift command signals.

24. The apparatus according to claim 1 wherein the shift unit is adapted to attempt to engage the chain with at least one of i) a laterally innermost front sprocket in combination with a laterally outermost rear sprocket and ii) a laterally outermost front sprocket in combination with a laterally innermost rear sprocket, but the prohibiting unit causes the shift unit to engage the chain with a different front sprocket than the attempted front sprocket.

* * * * *